(12) United States Patent
Rayman

(10) Patent No.: US 6,352,090 B1
(45) Date of Patent: Mar. 5, 2002

(54) TIRE WITH REVERSED CARCASS PLY TURNUP CONFIGURATION

(75) Inventor: William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/424,275

(22) PCT Filed: May 20, 1999

(86) PCT No.: PCT/US97/08537
§ 371 Date: Nov. 18, 1999
§ 102(e) Date: Nov. 18, 1999

(87) PCT Pub. No.: WO98/52777
PCT Pub. Date: Nov. 26, 1998

(51) Int. Cl.[7] .................. B60C 9/00; B60C 11/02; B60C 15/00

(52) U.S. Cl. .............. 152/167; 152/209.1; 152/525; 152/526; 152/541; 152/547; 152/555

(58) Field of Search .................. 152/553, 539, 152/541, 42, 188, 169, 67, 354, 361, 547, 555, 209.1, 525–526

(56) References Cited

U.S. PATENT DOCUMENTS

| | | |
|---|---|---|
| 1,054,820 A | 3/1913 | Bowden |
| 1,494,621 A | 5/1924 | Ogilvie |
| 2,609,026 A | 9/1952 | Luchinger-Caballero |
| 2,990,867 A | 7/1961 | Barassi |
| 3,018,810 A | 1/1962 | Barassi |
| 3,087,526 A | 4/1963 | Barassi et al. |
| 3,107,713 A | 10/1963 | Cushman |
| 3,224,482 A | 12/1965 | Barassi et al. |
| 3,224,483 A | 12/1965 | Gross et al. |
| 3,612,137 A | * 10/1971 | Guyot ................. 152/362 |
| 3,897,814 A | 8/1975 | Grawey |
| 3,970,493 A | 7/1976 | Grawey |
| 4,050,495 A | 9/1977 | Olsen |
| 4,071,068 A | 1/1978 | Olsen |
| 4,092,196 A | 5/1978 | Miller et al. |
| 4,269,646 A | 5/1981 | Miller et al. |

(List continued on next page.)

FOREIGN PATENT DOCUMENTS

| | | |
|---|---|---|
| DE | 1505157 | 7/1969 |
| EP | 0202925 | 5/1986 |
| EP | 0206679 | 6/1986 |
| EP | 0251145 | 6/1987 |
| EP | 0313500 | 10/1988 |
| EP | 0670229 | 2/1995 |
| FR | 540291 | 4/1922 |
| FR | 1124766 | 7/1956 |
| GB | 1322281 | 7/1970 |
| GB | 1322281 | * 7/1973 |
| GB | 2073109 | 1/1981 |
| JP | 4-11506 | 4/1990 |
| JP | 06183224 A | * 7/1994 |
| JP | 06320922 | 11/1994 |
| JP | 07117419 | 5/1995 |
| JP | 08162820 | 8/1996 |

*Primary Examiner*—Jeff H. Aftergut
*Assistant Examiner*—Justin Fischer
(74) *Attorney, Agent, or Firm*—Howard M. Cohn

(57) ABSTRACT

An improved track belt tire is constructed of a removable tread belt assembly mounted to the outer circumferential surface of a multi-layered tire carcass with an embedded carcass ply having ply turnup ends looped around and extending axially inwards from the bead wires. The outermost ends of the first and second turnup ends being located radially outward at a distance equal to between about 2 and 3 times the diameters of the bead wires so that the ends of the turnup ends are supported by the flange ends of the tire rim when a tire carcass mounted to the tire rim is deflected. The turnup ends are also supported by first, second, third, and fourth apex elements disposed about each of the bead wires. The ply line of the first carcass ply layer can also follow the natural ply line.

20 Claims, 6 Drawing Sheets

U.S. PATENT DOCUMENTS

| | | |
|---|---|---|
| 4,286,644 A | 9/1981 | Pond, Jr. |
| 4,304,618 A | 12/1981 | Abbott |
| 4,351,380 A | 9/1982 | Pillod, Jr. et al. |
| 4,474,633 A | 10/1984 | Watts |
| 4,480,670 A | 11/1984 | Payne |
| 4,609,023 A | 9/1986 | Loser |
| 4,846,238 A | 7/1989 | Kadota et al. |
| 5,236,031 A | 8/1993 | Honbo et al. |
| 5,261,474 A * | 11/1993 | Lobb .......................... 152/454 |
| 5,513,686 A * | 5/1996 | Diarnaz ....................... 152/540 |

* cited by examiner

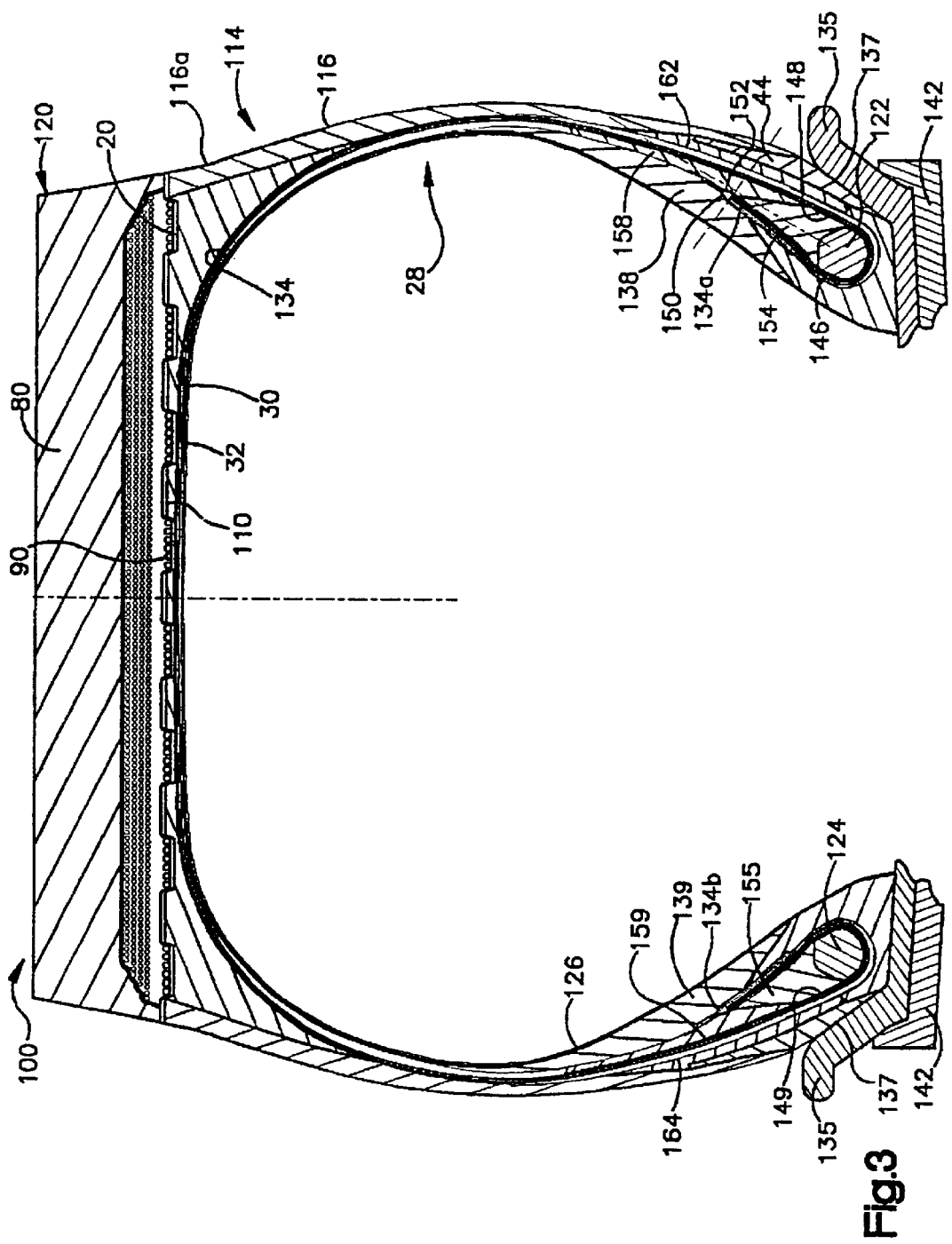

TIRE WITH REVERSED CARCASS PLY TURNUP CONFIGURATION

TECHNICAL FIELD

This invention relates to pneumatic tires with track belts and more particularly to an improved removable track belt pneumatic tire constructed of a removable track belt mounted on an improved radially reinforced beaded tire carcass that is typically for use with earthmoving vehicles.

BACKGROUND OF THE INVENTION

The track belt pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art track belt tire assemblies comprise a plurality of ground-engaging shoes spaced about the periphery of the supporting structure. The heavy loads on the shoes result in great stresses being developed that sometimes lead to premature tire failure. The U.S. Pat. No. 4,351,380 patent is directed to an improved track belt assembly which comprise a plurality of shoes spaced about the periphery of a load-supporting structure and secured to a reinforcing belt structure disposed on the side of the shoe opposite the ground-engaging side thereof.

The large pneumatic tires, which are typically used for earthmoving vehicles, sometimes fail due to the high stress and loads caused by the harsh environmental conditions in which they are operated. These large prior art pneumatic tires had a greater tendency to fail in one of three tire locations or areas than because of other sources of failure. The first problem area was that the turnup end of the ply would sometimes break through the sidewall of the tire. A second problem area was a tire failure in the bead area. The third problem area was a tendency to fail in the crown and/or shoulder area of the tire.

In the prior art, conventional solutions to these problems include increasing the gauge of the sidewall to increase the bending stiffness, increasing bead area stiffness and robustness, and decreasing tire deformation under load by increasing the sidewall stiffness. To further improve tire durability, the ply turnup portion of tires was typically reinforced.

In U.S. Pat. No. 4,609,023, having a common assignee with the present invention, the sidewall inserts were incorporated in the tire carcass to allow the ply structure to conform to its natural shape when the tire is inflated.

With the continual drive to improve earthmover performance, there is a continuing need to provide novel methods and tire designs for improving earthmover tire durability. The present invention is directed to an improved pneumatic tire and removable track belt assembly with which the frequency of premature tire failure is thought to be substantially reduced. The present invention is also directed to providing an improved pneumatic tire and track belt assembly which is designed to allow large tires to be transported in several sections and then assembled at the construction site to ease the otherwise difficult problem of transporting the large tires, i.e. sometimes over 13 feet in height and approximately 8,000 to 15,000 pounds. Moreover, the present invention relates to an improved pneumatic tire and removable track belt assembly with which the driving characteristics of the tire can be more economically changed and the inventory of the number of tire spares that are typically needed can be reduced.

OBJECTS AND SUMMARY OF THE INVENTION

It is an object of the present invention to provide a pneumatic tire for an earthmover vehicle, the pneumatic tire being as defined in one or more of the appended claims and, as such, having the capability of being constructed to accomplish one or more of the following subsidiary objects.

It is another object of the present invention to provide an improved tire and removable track belt assembly for an earthmover vehicle wherein the frequency of premature tire failure has been substantially reduced.

Another object of the present invention is directed to providing an improved tire and removable track belt assembly which is designed to allow large tires to be transported in several sections and then assembled at the delivery site.

Still another object of the present invention is to provide an improved tire and removable track belt assembly with which the driving characteristics of the tire can be quickly and economically changed.

Yet another object of the present invention is to provide an improved tire and removable track belt assembly with which the number of tire spares that are stored in inventory can be reduced.

Still another object of the present invention is to provide an improved tire and removable track belt assembly with a unique track belt that is restrained from expanding radially outwardly.

A further object of the present invention is to provide an improved tire and removable track belt assembly wherein the tire treads will maintain a more flat tread profile which will improve tread life and durability.

A still further object of the present invention is to provide an improved tire and removable track belt assembly wherein the belt is constructed to provide penetration protection.

A further object of the present invention is to provide an improved tire and removable track belt assembly wherein the belt is constructed with a unique carcass ply turnup to strengthen the tire in the bead area.

Still another object of the present invention is to provide an improved tire and removable track belt assembly with a unique turnup ply construction in the tire carcass that reduces the likelihood of tire failure caused by factors such as: a)one of the turnup ends of the carcass ply breaking through a sidewall of the tire; b)failure of the tire in the bead area; and c)failure of the tire in the upper shoulder area of one of the sidewalls.

In accordance with an embodiment of the invention, an improved track belt tire is constructed of a tire carcass having a plurality of annular lands and grooves formed around the outer circumference of the carcass. A removable track belt assembly is mounted to the outer circumferential surface of tire carcass to form the track belt tire. The track belt has a plurality of annular lands and grooves formed about the inner circumference thereof. A plurality of zero degree wires encircle the tire track belt within the annular lands of the tire tread. The removable tread belt assembly includes a ground contacting tread portion on the outer surface thereof. The tire carcass has a plurality of circumferentially extending lands and grooves oriented to engage complementary ones of the circumferentially extending lands and grooves on the inner surface of the removable tread belt assembly.

BRIEF DESCRIPTION OF THE DRAWINGS

FIG. 3 is a cross-sectional view illustrating an alternative embodiment where the carcass ply turns up axially inward about a bead wire;

DEFINITIONS

Figure 1:
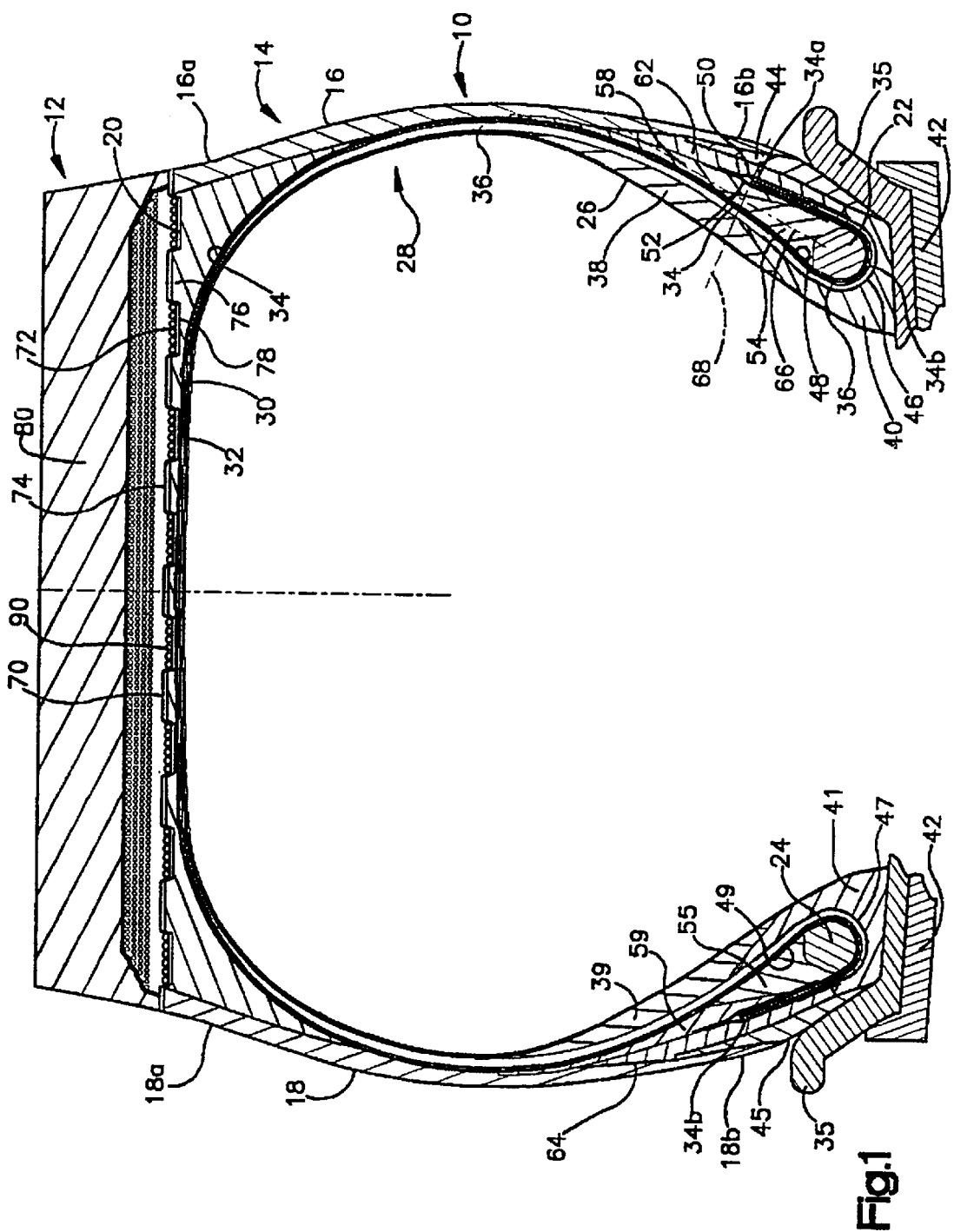
FIG. 1 is a cross-sectional view illustrating the improved tire with removable tire tread belt made in accordance with the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers or plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about 25°–50° angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead wire of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial and "radially" means directions extending radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of improved track belt pneumatic tire 10 which in the specific embodiment illustrated is a size 60/80R63 and/or a 70/68R63 earthmover tire. The size 60/80R63 tire has a 162 inch (411.48 cm) maximum inflated outside diameter, a 60.00 inch (152.40 cm) maximum inflated width tire in the axial directions, and a nominal bead diameter of 63 inches (160.02 cm). The size 70/68R63 tire has a 162 inch (411.45 cm) maximum inflated outside diameter, a 70.0 inch (177.80 cm) maximum inflated width tire in the axial directions, and a nominal bead diameter of 63 inches (160.02 cm). The tires are typically inflated to a pressure of about 100 pounds per square inch (psi) with air and sometimes with an air/nitrogen mixture.

The improved track belt pneumatic tire 10 includes a ground engaging, circumferentially extending track belt 12 mounted on a radially reinforced, beaded tire carcass 14. The beaded tire carcass 14 generally includes a pair of tire sidewalls 16, 18 extending radially inwardly from the outer circumferential surface 20 of the tire carcass and terminating at their radial extremities in a pair of bead wires 22, 24, respectively. The sidewalls 16, 18 each have an upper portion 16a, 18a, respectively, in the shoulder region of tire carcass 14 and radially inward of the maximum section width of the tire carcass, and a lower portion 16b, 18b, respectively, adjacent the bead wires 22, 24, respectively, and radially inward of the maximum section width of the tire carcass 14. The details of the construction of tire carcass 14 are described in detail hereinafter.

As used herein, a "track belt pneumatic tire" is a two-part assembly of a "track belt" mounted on a "tire carcass". The term "tire carcass" is used to refer to a structure that includes an inner ply liner, bead wires, a ply layer (or carcass ply) having turnup ends and sidewalls, and additional tire components such as one or more barrier plies, a barrier rubber layer, lower gum chafers upper gum chafers, chafer plies, flippers, gum layers, apexes, and stiffeners (a type of apexes). The term "track belt" is used to refer to a structure that includes a tread portion, a plurality of tread belts, and which has an inner circumference surface for mating to an outer circumference surface of the tire carcass.

TIRE CARCASS

Figure 2:
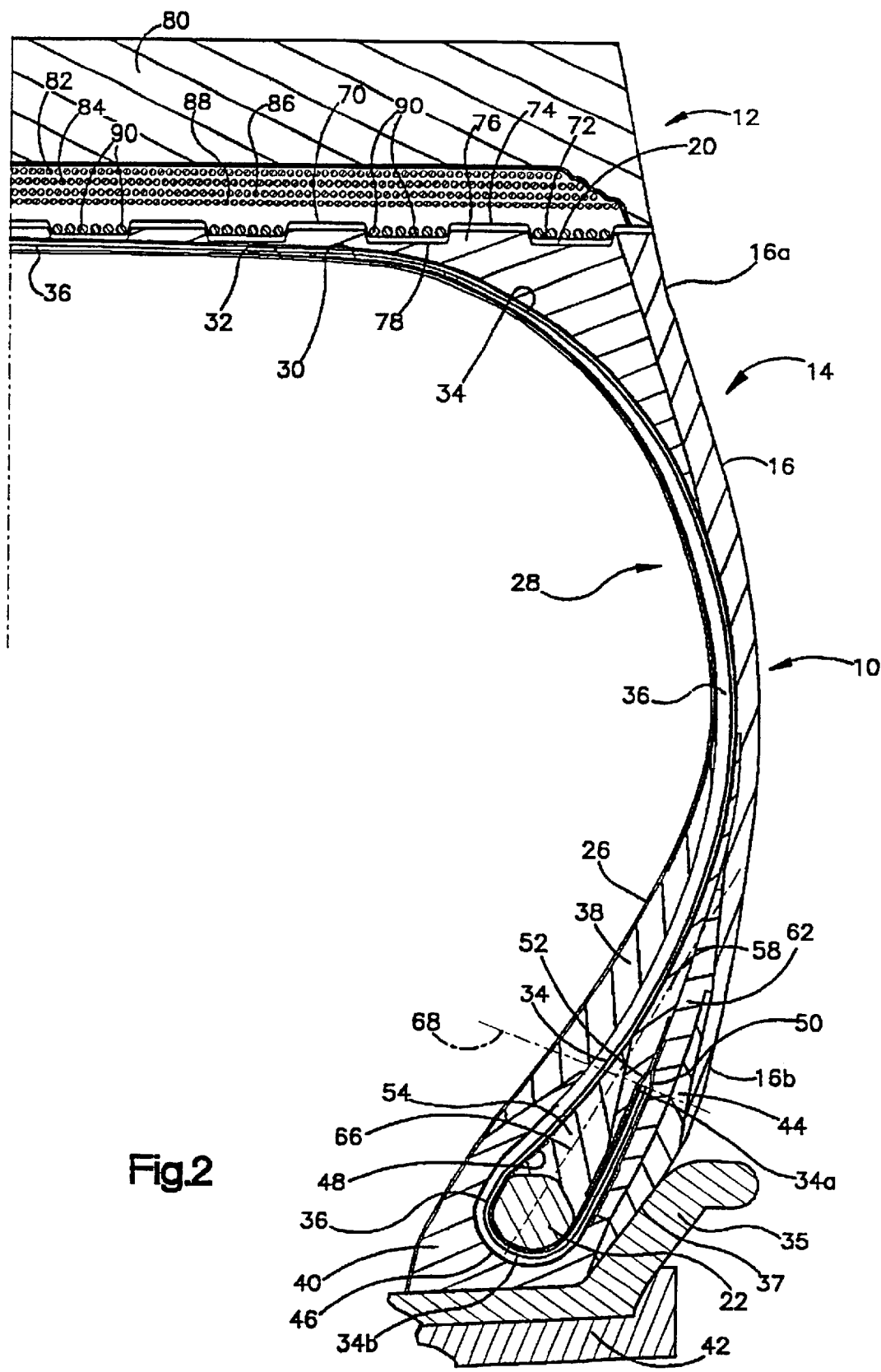
FIG. 2 is an enlarged, cross-sectional view illustrating one side or half of the symmetrical tire shown in FIG. 1 and made in accordance with the present invention.

Referring FIGS. 1 and 2, the details of tire carcass 14 are illustrated. The axially inward surface 28 is a inner ply liner 26 which forms an innerliner that holds the air pressure for inflating tire 10. The inner ply liner 26 covers the entire interior facing surface 28 of the tire carcass 14 and serves to hold the air within the carcass that is used to inflate tire 10. Fabric barrier plies 30 and 32 are provided within the tire carcass 12 in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between one and four barrier plies, as needed for a specific design.

The carcass 14 also includes in its construction at least one rubberized laminated ply layer 34 of tire cord fabric which extends radially inwardly from the outer circumferential surface 20 of the tire carcass, also called the crown area of the tire carcass, and has turnup ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material. The location of the turnup ends 34a and 34b with respect to the flange 35 of the tire mounting rim 42 and the bead wires 22 and 24, respectively, is a significant aspect of the invention and will be discussed in more detail below.

Between the innerliner 26 and the ply layer 34 is a barrier rubber layer 36 which backs up the entire length of ply layer 34 and is formed of a soft compound of rubber which squeezes against the ply layer 34. Annular stiffeners, known as apexes or apex elements 38, 39 herein, each having a generally triangular shape are provided radially outward of the bead wires 22, 24, respectively, and between the barrier rubber 36 and the innerliner 26. The apexes 38, 39 extend from approximately the mid-sidewall and the area of innerliner 26 radially outward from the bead wires 22, 24, respectively, for stiffening the bead area to help prevent the tire from bending over the flange 35. Axially outward from apexes 38, 39 and between the ply layer 34 where it turns up about bead wires 22, 24 are located lower gum chafers 40, 41, respectively, that support the bead wires 22, 24, respectively, in the area of the wheel mounting rim 42 and to prevent chafing of the tire by an adjacent wheel mounting rim. Upper gum chafers 44, 45 are disposed against the lower gum chafers 40, 41, respectively, and the lower tire sidewalls 16b, 18b, respectively, to provide support for the bead wires 22, 24 in the area of the flange 35 and to prevent chafing of the tire by an adjacent wheel mounting rim.

Figure 2A:
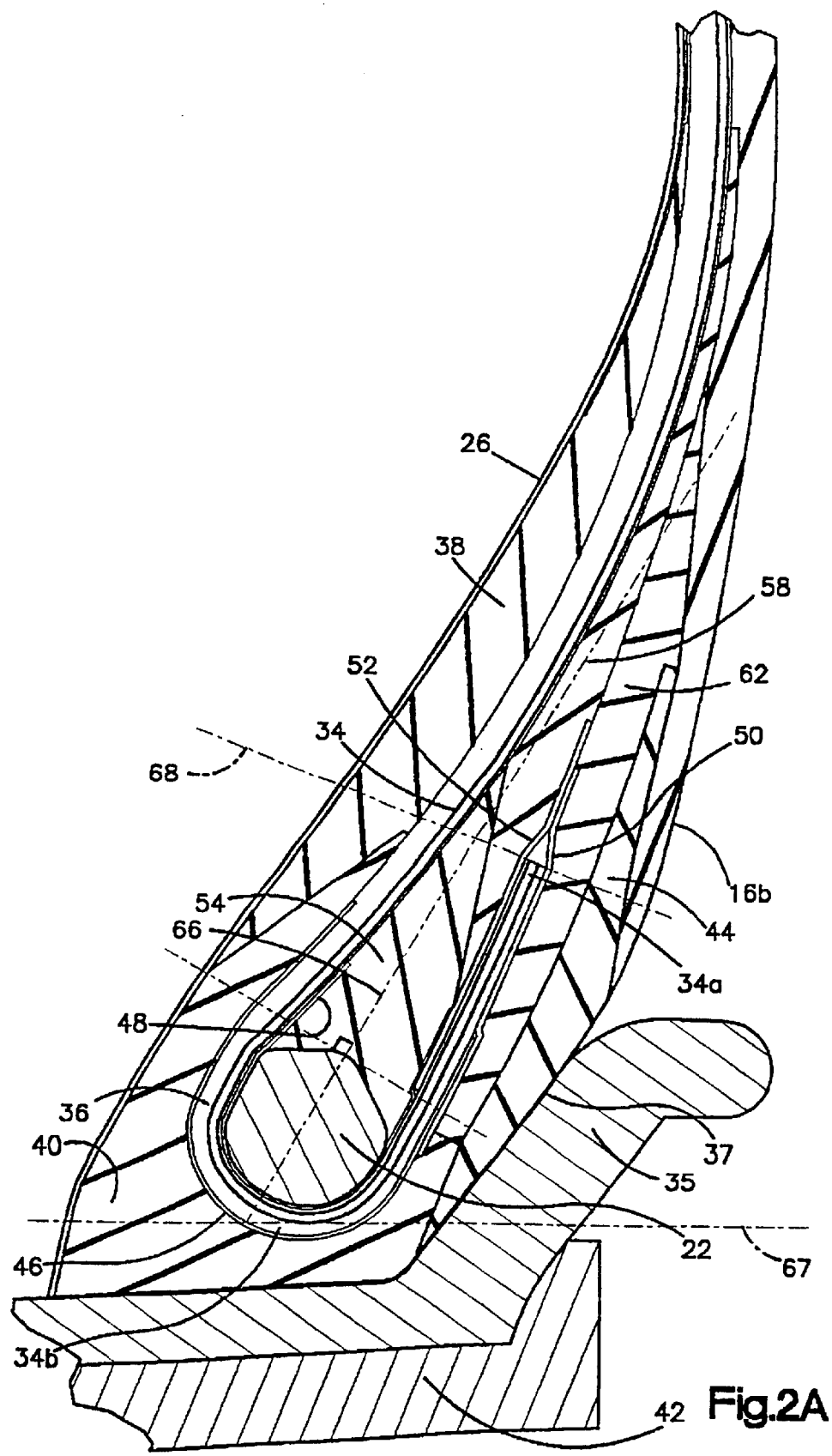
FIG. 2A is an enlarged, cross-sectional view illustrating the bead area of the tire shown in FIG. 2.

Between the lower chafers 40, 41 and the rubber barrier 36 in the area partially surrounding bead wires 22, 24 are located wire chafer plies 46, 47 that support the bead wires 22, 24, respectively. As best seen in FIGS. 2 and 2A, the wire chafer plies 46 are primarily disposed against the inner facing surfaces of lower chafers 40, 41. Between the inner surface of ply layer 34 and the bead wires 22 and 24 are located flippers 48, 49, respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b, respectively, of ply 34 and enable the movement of ply 34 between the gum layers 50 and 52 without exposing the wire within ply 34 during tire construction or severe bending of the tire.

APEX CONFIGURATION

Two annular stiffeners, referred to as apexes 54, 55 herein, each having a generally four sided shape, are provided radially outward of the bead wires 22, 24, respectively, between flippers 48, 49, and out to apexes 58, 59, for stiffening the area about the bead wires 22, 24, respectively, to help prevent the tire from bending over the flange 35. The apexes 54, 55 are further disposed between the lower inner end of rubberized ply layer 34 and the turn up ends 34a and 34b. Abutted against and extending radially outward from the apexes 54 and 55 are two annular stiffeners, referred to herein as apexes 58 and 59, respectively, which helps support the ends 34a and 34b of rubberized ply layer 34. The apexes 54, 55, are constructed of a relatively hard compound having a modulus of about 12.2–14.9 megapascals/cm$^2$ at 200% elongation. Axially outward from the apexes 58 and 59 are the outer apexes 62 and 64, respectively. The apexes 38, 39, 58, 59, and 62, 64 are generally constructed of the same relatively soft rubber compound having a modulus of about 7.2–8.8 megapascals/cm$^2$ at 200% elongation and act to provide a soft cushion that absorbs the stresses around the turn up ends 34a and 34b of the ply layer 34 which is caused by stress forces generated by the flexing of the tire. While the apexes 38, 39, 58, 59, and 62, 64 are typically constructed of the same rubber compound, it is within the terms of the invention to construct one or more of the apexes with a different modulus within the range of between about 7.2 and 8.8 megapascals/cm$^2$ at 200%. In the preferred embodiment, the apexes 38, 39, 58, 60, 62 and 64 are softer than the apexes 54 and 55 which are located directly adjacent and radially outward from the bead wires 22 and 24, respectively. Preferably the rubber compound used to form the apexes 54 and 55 is about 20% to about 50% stiffer than the rubber compound used to form apexes 38, 39, 58, 59, 62 and 64.

LOCATION OF CARCASS PLY TURNUP ENDS

The location of the ply turnup ends 34a and 34b are an important aspect of the present invention. As best illustrated in FIG. 2A, preferably the turnup ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turnup ends 34a, 34b of ply layer 34 is important in that it can withstand the pressure exerted against the ply end, which was sometimes sufficient to cause the ply end to break through the sidewall in prior art constructions where the turnup ends extend closer to the center of the tire sidewalls. The advantage of having the outer ends of the turnup ends 34a, 34b of carcass ply 34 at a lower position closer to the radial outward portion of the flange 35 is so that when operating conditions cause the tire to deflect outwards, the ends of turnup ends 34a, 34b of the ply layer 34 will be supported by flange 35. This arrangement will greatly reduce the possibility that the outer ends of turnup ends 34a, 34b will be the cause of a crack in or penetrate axially outward through the sidewall of the tire carcass 14.

NATURAL PLY LINE

The ply line of ply layer 34 follows the natural ply line, which means it is already at its natural shape upon inflation.

The carcass ply 34 retains its natural shape when inflated to reduce the inflation strain on the tire. The portion of the ply cord extending down to the bead 22 is equally supported along its length by the axially interior surface 37 of the rim flange 35 which is substantially parallel to the centerline 66 passing though beads 22, 24.

TRACK BELT

The ground engaging, circumferentially extending track belt 12 is removably mounted onto the tire carcass 14. As best shown in FIG. 1, the underside or inner circumference surface 70 of track belt 12 comprises a plurality of annular lands 72 and grooves 74 that mate with lands 76 and grooves 78 of tire carcass 14 to restrain belt 12 from lateral or axial movement with respect to the carcass 14. The tire track belt 12 includes a tread portion 80 and a plurality of tread belts 82, 84, 86, and 88 (82–88). While four tread belts 82–88 are illustrated, is it within the scope of the invention to use other numbers of tread plies as needed. The combination of a removable tire track belt with a tire carcass for use with large earthmoving vehicles is important in that it enables a portion of a tire to be replaced instead of the entire tire in the event that one portion of the tire, i.e., the tire belt or the tire carcass, wears out before the other part. Also, it may be desirable to have different types of tread designs such as for example driving or steering tread designs. This feature allows for a less expensive means of changing the tire tread to construct the appropriate style of desired tire. This feature would greatly reduce the cost of storing spare tires and could even extend the operating time of the tires.

A unique aspect of the present invention is the provision of zero degree wires 90. The zero degree wires 90 encircle the tire tread and are provided to restrict the radially outward growth of the tread belt 12 due to a serious deflection in the tire carcass. By keeping the tire tread from expanding radially outward, the tire treads will maintain a more flat tread profile which will improve tread life and durability. It will also provide many layers of wire that will provide cut and penetration protection. The positioning of the zero degree wires 90 within the annular lands 72 of the tire tread 12 has two additional advantages. First, when the tire tread belt is being installed on the tire carcass, the tire carcass is inflated and forced outward so that its lands 76 are pressed into the annular grooves 74 disposed about the inner surface of the tire tread belt 12. In the same way, the lands 72 of the tread belt which contain the zero degree wires 90 are pressed into the grooves 20 of the tire carcass 14. However, since the wires 90 prevent the annular lands 76 from expanding radially outward from the crown of the tire carcass 14, the lands 76 are pressed into the grooves 70 formed in the tire belt 12. Since the tire belt can expand slightly more in the areas without the zero degree wires 90, the annular lands 76 have a tendency to press deeper into annular grooves 74 to better support the tire belt 12 on the tire carcass 14. While the zero degree wires 90 are illustrated as being in the annular lands 72, it is also within the scope of the invention to include an additional layer of zero degree wire cable embedded in the belt between the lands 71 and the tread belts 72.

ALTERNATIVE EMBODIMENTS OF TURNUP PLY

Figure 4:
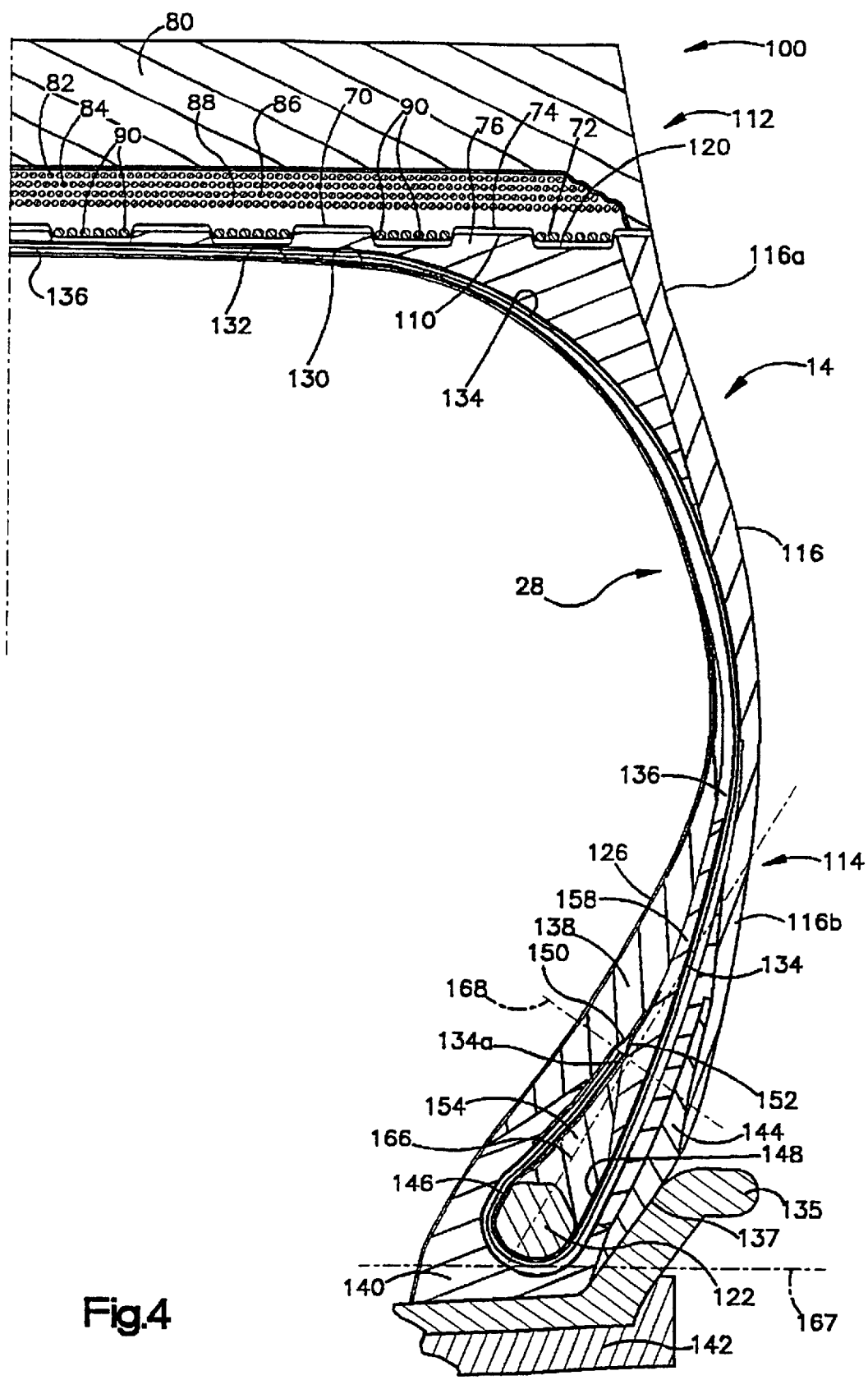
FIG. 4 is an enlarged, cross-sectional view illustrating one side or half of the symmetrical tire shown in FIG. 3 and made in accordance with the present invention.
Figure 4A:
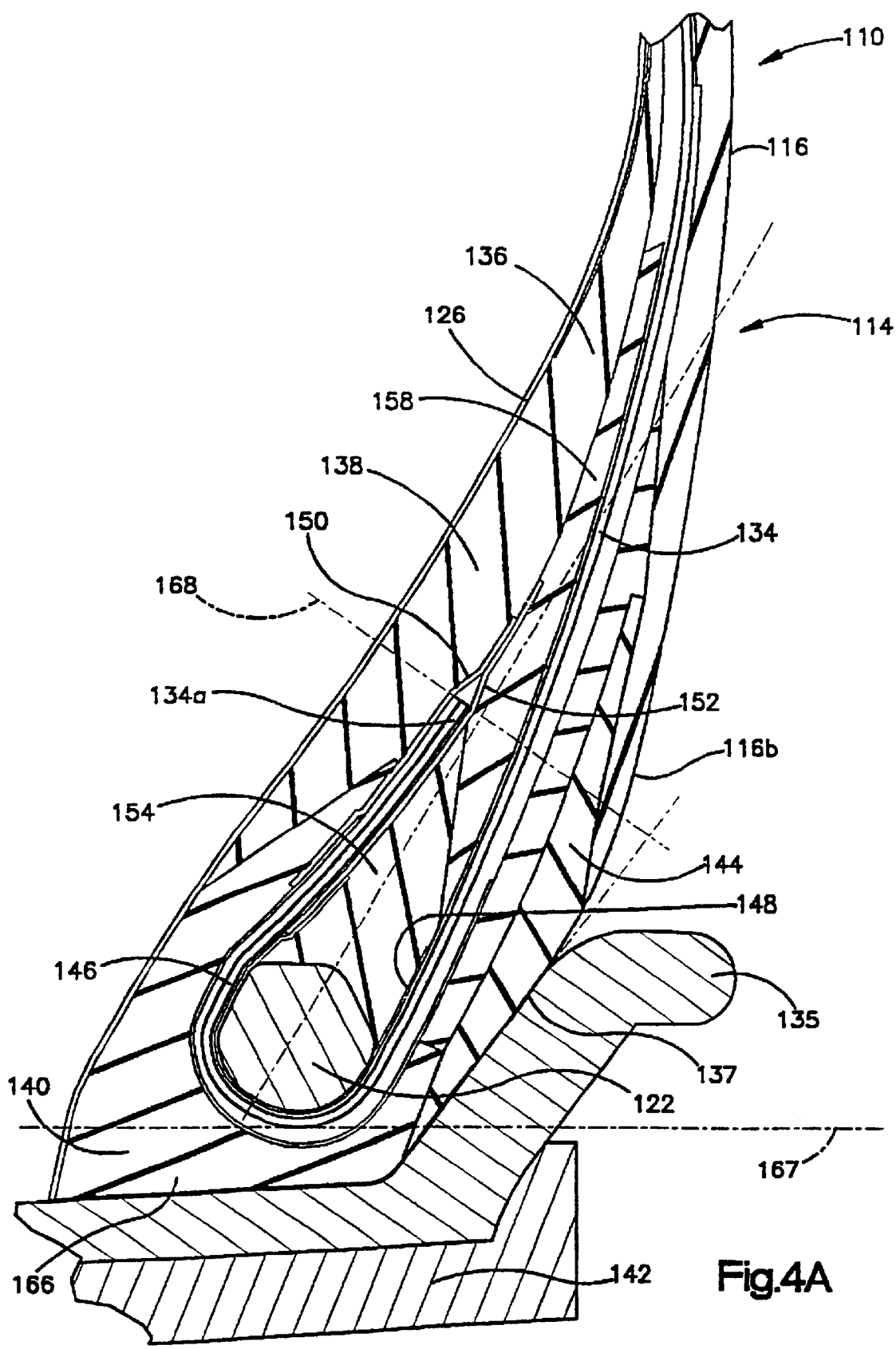
FIG. 4A is an enlarged, cross-sectional view illustrating the turnup portion of the tire carcass shown in FIG. 4.

An alternative of a tire carcass, such as tire carcass 114, as illustrated in FIGS. 3, 4 and 4A, includes in its construction at least one rubberized laminated ply layer 134 of tire cord fabric which extends radially inwardly from the outer circumferential surface 110 of the tire carcass, also called the crown area of the tire carcass, and has turnup ends 134a and 134b which wrap or loop around bead wires 122 and 124, respectively. Although the carcass ply 134 is shown as being of single ply construction, a multi-ply construction can be employed if desired. Preferably, the carcass ply 134 is made of a rubberized ply of steel cord, but it can be made of a non-steel carcass reinforcing material. The location of the turnup ends 134a and 134b with respect to the flange 135 of the tire mounting rim 142 and the bead wires 122 and 124, respectively, is a significant aspect of the invention and will be discussed in more detail below.

Between the innerliner 126 and the ply layer 134 is a barrier rubber layer 136 which backs up the entire length of ply layer 134 and is formed of a soft compound of rubber which squeezes against the ply layer 134. Annular stiffeners, known as apex elements or just apexes 138,139 herein, each having a generally triangular shape are provided radially outward of the bead wires 122, 124, respectively, and between the barrier rubber 136, the innerliner 126 and the turnup ply 134. The apexes 138, 139 extend from approximately the mid-sidewall and the area of innerliner 126 radially outward from the bead wires 122, 124, respectively, for stiffening the bead areas to restrain the tire from bending over the flange 135. Axially inward from apexes 138, 139 and between the ply layer 134 where it turns up about bead wires 122, 124 are located lower gum chafers 140, 141, respectively, that support the bead wires 122, 124, respectively, in the area of the wheel mounting rim 142 and to prevent chafing of the tire by an adjacent wheel mounting rim. Upper gum chafers 144, 145 are disposed against the lower gum chafers 140, 141, respectively, and the lower tire sidewalls 116b, 118b, respectively, to provide support for the bead wires 122, 124 in the area of the flange 135 and to prevent chafing of the tire by an adjacent wheel mounting rim.

Between the lower chafers 140, 141 and the rubber barrier 136 in the area partially surrounding bead wires 122, 124 are located wire chafer plies 146, 147 that support the bead wires 122, 124, respectively. As best seen in FIGS. 3, 4 and 4A, the wire chafer plies 146 are primarily disposed against the inner facing surfaces of lower chafers 140, 141. Between the inner surface of ply layer 134 and the bead wires 122 and 124 are located flippers 148, 149, respectively, which are reinforced fabric materials that are wrapped about the bead core and at least a portion of one of the apexes. On either side of the ends 134a, 134b of ply layer 134 are two wire coat, gum layers 150 and 152 which cover the ends 134a, 134b,respectively, of ply 134 and enable the movement of ply 134 between the wire plies 150 and 152 without exposing the wire within ply 134 during tire construction or severe bending of the tire.

APEX CONFIGURATION OF ALTERNATIVE EMBODIMENTS

Two annular stiffeners, referred to as apexes or apex elements 154, 155 herein, each having a generally four sided shape, are provided radially outward of the bead wires 122, 124, respectively, between flippers 148, 149, and out to apexes 158, 159, for stiffening the area about the bead wires 122, 124, respectively, to help prevent the tire from bending over the flange 135 of the wheel rim 142. The apexes 154, 155 are further disposed between the lower inner end of rubberized ply layer 134 and the turn up ends 134a and 134b.Abutted against and extending radially outward from the apexes 154 and 155 are two annular stiffeners, referred to herein as apexes 158 and 159, respectively, which help support the ends 134*a* and 134*b* of rubberized ply layer 134. The apexes 154, 155, are constructed of a relatively hard compound having a modulus of about 12.2–14.9 megapascals/cm² at 200% elongation. Axially inward from the apexes 154 and 155 are the inner apexes 138 and 139, respectively. Axially outward from the apexes 154 and 155 are the outer apexes 162 and 164, respectively. The apexes 138, 139, 158, 159, and 162, 164 are generally constructed of the same relatively soft rubber compound having a modulus of about 7.2–8.8 megapascals/cm² at 200% elongation and act to provide a soft cushion that absorbs the stresses around the turn up ends 134*a* and 134*b* of the ply layer 134 which is caused by stress forces generated by the flexing of the tire. While the apexes 138, 139, 158, 159, and 162, 164 are typically constructed of the same rubber compound, it is within the terms of the invention to construct one or more of the apexes with a different modulus within the range of about 7.2–8.8 megapascals/cm² at 200%. In the preferred embodiment, the apexes 138, 139, 158, 159, 162 and 164 are softer than the apexes 154 and 155 which are located directly adjacent and radially outward from the bead wires 122 and 124, respectively. Preferably the rubber compound used to form the apexes 154 and 155 is about 20% to about 50% stiffer than the rubber compound used to form apexes 138, 139, 158, 159, 162 and 164.

LOCATION OF PLY TURNUP ENDS OF ALTERNATIVE EMBODIMENTS

The location of the carcass ply turnup ends 134*a* and 134b are an important aspect of the present invention. Preferably, the turnup ends 24*a*, 34*b* are located radially outward. They are looped axially inward of the bead wires 122, 124. This is an improvement of great importance because the pressure of the tire pressing the bead area of the tire carcass 114 against the flange 135 actually causes the ply ends 134*a*, 134*b* to press against the portion of the carcass ply leading axially downward from the crown of the carcass to the bead wires 122, 124. This pressing causes a force which tends to prevent radial movement of the ply ends 134*a*, 134*b*. This in turn tends to added extra support to the sidewalls which helps prevent them from moving in the axially outward directions. Also the bead area around the bead wires 122, 124 is strengthen and the tendency for rotational movement of the bead wires is reduced because of the effect from pressing the ply ends 134*a*, 134*b* against the portion of the carcass ply 134 leading axially downward from the crown of the carcass to the bead wires 122, 124.

Another innovation with the design illustrated in FIGS. 3, 4 and 4A is that the turnup ends 134*a*, 134*b* are located a distance of between about 2 and 3 bead diameters from the intersection of a centerline 166 which extends through the center of bead wire 122, 124 and a line 167 which is tangent to the most radially inward surface of the carcass ply 134 where the carcass ply turn up end portions 134*a*, 134*b* loop around the wire beads 122, 124 to a line 168 which is perpendicular to centerline 166 and is tangent to the outer ends of the carcass ply layer 134. This location of the outer ends of the turnup ends 134*a*, 134*b* of ply layer 134 is important because the pressure exerted against the ply end was sometimes sufficient to cause the ply end to break through the sidewall in prior art constructions where the turnup end extends closer to the center of the tire sidewall. The advantage of having the turnup ends 134*a*, 134*b* of carcass ply 134 at a lower position closer to the radial outward edge of the flange 135 is so that when operating conditions cause the tire to deflect outwards, the ends 134*a*, 134*b* of the ply layer 134 will be supported by the ply 134 and the flange 135. The overall beneficial effect of the looped axially inward ply layer ends 134*a*, 134*b* is a greatly reduced possibility that the turnup ends 134*a*, 134*b* will penetrate axially outwards through the sidewall of the tire carcass 114.

While FIGS. 3, 4 and 4A illustrate a specific configuration of apexes 156, 157, 158, 159, 162, 164, flippers 148, 149, as well as other generally common carcass elements as shown, the looped axially inward ply layer ends 134*a*, 134*b* can be incorporated in a radial ply tire with any configuration of apexes, flippers, and other common carcass elements, as required for the specific type of radial tire. While a track belt pneumatic tire 100 with a tire track belt 120 mounted onto the tire carcass 114 can be constructed with looped axially inward ply layer turnup ends 134*a*, 134*b*,it is also within the terms of the invention to incorporate the looped axially inward ply layer turnup ends into a pneumatic tire, such as for example the pneumatic tire shown in the U.S. Pat. No. 4,609,023 patent, which is hereby incorporated in its entirety herein. Moreover, while the present invention of incorporating the looped axially inward ply layer turnup ends into a pneumatic tire, such as for example large pneumatic tires suitable for mounting on earthmoving vehicles, it is also within the terms of the invention to incorporate the inward turnup ply ends for a pneumatic tire suitable for any type of vehicle including but not exclusive truck, automotive, commercial and residential vehicles.

NATURAL PLY LINE OF ALTERNATIVE EMBODIMENTS

The natural ply line of ply layer 134 follows the natural ply line, which means it is already at its natural shape upon inflation. The carcass ply 134 retains its natural shape when inflated, thereby reducing the inflation strain on the tire. The portion of the ply layer 134 extending down to the beads 122, 124 is equally supported along its length by the axially interior surface 137 of rim flange 135 which is substantially parallel to the centerline 166 passing through the center of beads 122 and 124.

Throughout the specification the term rubber compound means any elastomeric compound.

It is apparent that there has been provided in accordance with this invention apparatus and methods for constructing an improved tire and removable track belt assembly wherein the tire durability has been substantially increased by the inclusion of an improved tire carcass ply turnup configuration with the. The improved tire carcass ply turnup configuration can be incorporated into a pneumatic tire with a one piece tire carcass and tread package with first and second turnup ends looped around and extending axially inwards from the bead wires. The improved tire carcass ply turnup configuration can also be incorporated into a tire with an improved apex construction. The improved tire and removable track belt assembly allows large tires to be transported in several sections and then assembled at the delivery site. Further, the removable track belt assembly allows a different belt to be applied to a tire carcass so as to alter the driving characteristics of the tire quickly and economically. Moreover, the removable track belt assembly provides a unique track belt that is restrained from expanding radially outwardly whereby the tire treads will maintain a more flat tread profile which in turn will improve tread life and durability and provide improved penetration protection.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. An off-the-road earthmover-type pneumatic tire, having an inflatable, multi-layered tire carcass with at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the tire characterized by:

the first carcass ply embedded within the tire carcass and extending entirely about the circumference of the tire and having first and second turnup ends extending axially inwards and turned up about the bead wires; and a removable tread belt assembly mounted to the outer circumferential surface of the inflatable tire carcass;

further characterized in that first (54,55), second (58,59), third (38,39), and fourth (62,63) apex elements are disposed about each of the bead wires, the first of the apex elements being located adjacent and radially outward from each of the bead wires, the second of the apex elements being located adjacent and radially outwards from the first of the apex elements and between a section of the first carcass ply leading from the circumference of the tire carcass to the bead wires and a section of the first and second turnup ends of the carcass ply, the third of the apex elements being located axially between an innerliner and the first and second turnup ends and extending radially outward from the bead wires to approximately the middle of the sidewalls, and the fourth of the apex elements being located axially between the outermost carcass ply and the upper gum chafers.

2. The pneumatic tire of claim 1 further characterized by the outermost ends of the first and second turnup ends being located radially outward at a distance equal to between about 2 and 3 times the diameters of the bead wires as measured from the intersection of a first tangent line, which is tangent to the outer ends of the turnup ends of the carcass ply, and a line perpendicular to said first tangent line, which extends through the center of the bead wires, to a line tangent to the most radially inward surface of the carcass ply where the carcass ply turnup portions loop around the wire beads.

3. The pneumatic tire of claim 1 characterized in that the first apex element is constructed of a first elastomer which has a modulus at 200% elongation which is greater than the modulus of a second elastomer from which the second, third and fourth of the apex elements are constructed.

4. The pneumatic tire of claim 1 further characterized in that it has an interlocking structure to secure the removable tread belt assembly to the inflatable tire carcass.

5. The pneumatic tire of claim 4 characterized in that the interlocking structure includes an interlocking belt structure on the inner surface of the removable tread belt assembly for engaging a complementary interlocking support structure on the outer circumferential surface of the tire carcass.

6. The pneumatic tire of claim 5 characterized in that:

the interlocking belt structure comprises a plurality of circumferentially extending lands and grooves; and the interlocking support structure comprises a plurality of circumferentially extending lands and grooves oriented to engage complementary ones of the circumferentially extending lands and grooves on the inner surface of the removable tread belt assembly to prevent axial movement of the removable tread belt assembly with respect to the outer circumferential periphery of the tire carcass.

7. The pneumatic tire of claim 1 characterized in that the removable tread belt assembly includes a ground contacting tread portion on the outer surface thereof and a plurality of circumferentially extending lands and grooves oriented to prevent axial movement of the removable tread belt assembly with respect to the outer circumferential periphery of the tire carcass.

8. The pneumatic tire of claim 1 characterized in that when the tire is inflated and mounted on a flange having an axially inner surface at an angle less than 90 degrees, the centerline of the first carcass ply layer follows the natural ply centerline, and is substantially parallel to the flange's axially inner surface.

9. An off-the-road earthmover-type pneumatic tire, having an inflatable, multi-layered tire carcass with at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the tire characterized by:

the first carcass ply embedded within the tire carcass and extending entirely about the circumference of the tire and having first and second turnup ends extending axially inwards and turned up about the bead wires; and a removable tread belt assembly mounted to the outer circumferential surface of the inflatable tire carcass;

further characterized in that first, second, third, and fourth apex elements are disposed about each of the bead wires, the first of the apex elements being located adjacent and radially outward from each of the bead wires, the second of the apex elements being located adjacent and radially outwards from the first of the apex elements and between a section of the first carcass ply leading from the circumference of the tire carcass to the bead wires and a section of the first and second turnup ends of the carcass ply, the third of the apex elements being located axially between innerliner and the first and second turnup ends and extending radially outward from the bead wires to approximately the middle of the sidewalls, and the fourth of the apex elements being located axially between the outermost carcass ply and the upper gum chafers;

characterized in that the first apex element is constructed of a first elastomer which has a modulus at 200% elongation which is greater than the modulus of a second elastomer from which the second, third and fourth of the apex elements are constructed;

characterized in that the modulus of the first elastomer is at least about 20% to about 50% greater than the modulus of the second elastomer.

10. The pneumatic tire of claim 9 further characterized in that it has an interlocking structure to secure the removable tread belt assembly to the inflatable tire carcass.

11. The pneumatic tire of claim 10 characterized in that the interlocking structure includes an interlocking belt structure on the inner surface of the removable tread belt assembly for engaging a complementary interlocking support structure on the outer circumferential surface of the tire carcass.

12. The pneumatic tire of claim 11 characterized in that:

the interlocking belt structure comprises a plurality of circumferentially extending lands and grooves; and the interlocking support structure comprises a plurality of circumferentially extending lands and grooves oriented to engage complementary ones of the circumferentially extending lands and grooves on the inner surface of the removable tread belt assembly to prevent axial movement of the removable tread belt assembly with respect to the outer circumferential periphery of the tire carcass.

13. The pneumatic tire of claim 9 characterized in that the removable tread belt assembly includes a ground contacting tread portion on the outer surface thereof and a plurality of circumferentially extending lands and grooves oriented to prevent axial movement of the removable tread belt assembly with respect to the outer circumferential periphery of the tire carcass.

14. The pneumatic tire of claim 9 characterized in that when the tire is inflated and mounted on a flange having an axially inner surface at an angle less than 90 degrees, the centerline of the first carcass ply layer follows the natural ply centerline, and is substantially parallel to the flange's axially inner surface.

15. An off-the-road earthmover-type pneumatic tire, having an inflatable, multi-layered tire carcass with a tread portion disposed about the circumferential surface thereof, the tire carcass comprised of at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the tire characterized by:

the first carcass ply embedded within the tire carcass and extending entirely about the circumference of the tire and having first and second turnup ends extending axially inwards and turned up about the bead wires;

further characterized in that first, second, third, and fourth apex elements are disposed about each of the bead wires, the first of the apex elements being located adjacent and radially outward from each of the bead wires, the second of the apex elements being located adjacent and radially outwards from the first of the apex elements and between a section of the first carcass ply leading from the circumference of the tire carcass to the bead wires and a section of the first and second turnup ends of the carcass ply, the third of the apex elements being located axially between an innerliner and the first and second turnup ends and extending radially outward from the bead wires to approximately the middle of the sidewalls, and the fourth of the apex elements being located axially between the outermost carcass ply and the upper gum chafers.

16. The pneumatic tire of claim 15 further characterized by the outermost ends of the first and second turnup ends being located radially outward at a distance equal to between about 2 and 3 times the diameters of the bead wires as measured from the intersection of a first tangent line, which is tangent to the outer ends of the turnup ends of the carcass ply, and a line perpendicular to said first tangent line, which extends through the center of the bead wires, to a line tangent to the most radially inward surface of the carcass ply where the carcass ply turnup portions loop around the wire beads.

17. The pneumatic tire of claim 15 characterized in that the first apex element is constructed of a first elastomer which has a modulus at 200% elongation which is greater than the modulus of a second elastomer from which the second, third and fourth of the apex elements are constructed.

18. The pneumatic tire of claim 15 characterized in that when the tire is inflated and mounted on a flange having an axially inner surface at an angle less than 90 degrees, the centerline of the first carcass ply layer follows the natural (un-inflated) ply centerline, and is substantially parallel to the flange's axially inner surface.

19. An off-the-road earthmover-type pneumatic tire, having an inflatable, multi-layered tire carcass with a tread portion disposed about the circumferential surface thereof, the tire carcass comprised of at least one ply layer and a pair of spaced apart bead wires, the ply layer including at least a first carcass ply extending circumferentially about the tire and between the pair of bead wires; a pair of sidewall portions extending from the bead wires to the outer circumferential surface of the tire carcass; the tire characterized by:

the first carcass ply embedded within the tire carcass and extending entirely about the circumference of the tire and having first and second turnup ends extending axially inwards and turned up about the bead wires;

further characterized in that first, second, third, and fourth apex elements are disposed about each of the bead wires, the first of the apex elements being located adjacent and radially outward from each of the bead wires, the second of the apex elements being located adjacent and radially outwards from the first of the apex elements and between a section of the first carcass ply leading from the circumference of the tire carcass to the bead wires and a section of the first and second turnup ends of the carcass ply, the third of the apex elements being located axially between an innerliner and the first and second turnup ends and extending radially outward from the bead wires to approximately the middle of the sidewalls, and the fourth of the apex elements being located axially between the outermost carcass ply and the upper gum chafers;

characterized in that the first apex element is constructed of a first elastomer which has a modulus at 200% elongation which is greater than the modulus of a second elastomer from which the second, third and fourth of the apex elements are constructed;

characterized in that the modulus of the first elastomer is at least about 20% to about 50% greater than the modulus of the second elastomer.

20. The pneumatic tire of claim 19 characterized in that when the tire is inflated and mounted on a flange having an axially inner surface at an angle less than 90 degrees, the centerline of the first carcass ply layer follows the natural ply centerline, and is substantially parallel to the flange's axially inner surface.

* * * * *